United States Patent [19]

Theissig et al.

[11] Patent Number: 4,664,394
[45] Date of Patent: May 12, 1987

[54] DUST GUARD CAP FOR A HAND-HELD DRILLING DEVICE

[75] Inventors: Werner Theissig, Munich; Gerhard Rumpp, Inning, both of Fed. Rep. of Germany

[73] Assignee: Hilti Aktiengesellschaft, Fürstentum, Liechtenstein

[21] Appl. No.: 736,471

[22] Filed: May 21, 1985

[30] Foreign Application Priority Data

May 21, 1984 [DE] Fed. Rep. of Germany ....... 3418882

[51] Int. Cl.$^4$ ............................................ B23B 31/02
[52] U.S. Cl. .................................. 279/1 ME; 408/67; 408/241 G; 409/134; 277/212 FB
[58] Field of Search ............... 408/67, 241 R, 241 G, 408/239 R, 239 A, 238, 714, 710; 279/1 R, 1 Q, 1 ME; 277/212 R, 212 C, 212 FB, 152, 153; 409/134

[56] References Cited

U.S. PATENT DOCUMENTS

| 3,817,648 | 6/1974 | Miller | 408/239 |
| 3,881,838 | 5/1975 | Derbyshire | 408/67 |
| 3,984,192 | 10/1976 | Wanner et al. | 408/239 R |

FOREIGN PATENT DOCUMENTS

| 1069480 | 11/1959 | Fed. Rep. of Germany | 277/212 FB |
| 2243904 | 3/1974 | Fed. Rep. of Germany | 408/67 |
| 2604348 | 8/1977 | Fed. Rep. of Germany | 408/241 |
| 122174 | 6/1919 | United Kingdom | 408/714 |

Primary Examiner—Z. R. Bilinsky
Assistant Examiner—Arthur Dougas
Attorney, Agent, or Firm—Toren, McGeady and Goldberg

[57] ABSTRACT

A dust guard cap for the tool holder in a hand-held drilling device is formed of a casing secured on the tool holder and a cover member mounted on and extending across one end of the casing. The cover member forms an opening through which a tool can be inserted into the tool holder. Attached to the cover member and extending inwardly from the through opening is a resilient sleeve-like torus which forms a seal around the tool. An outwardly projecting bead is formed on the inner end of the torus and bears against the casing.

7 Claims, 4 Drawing Figures

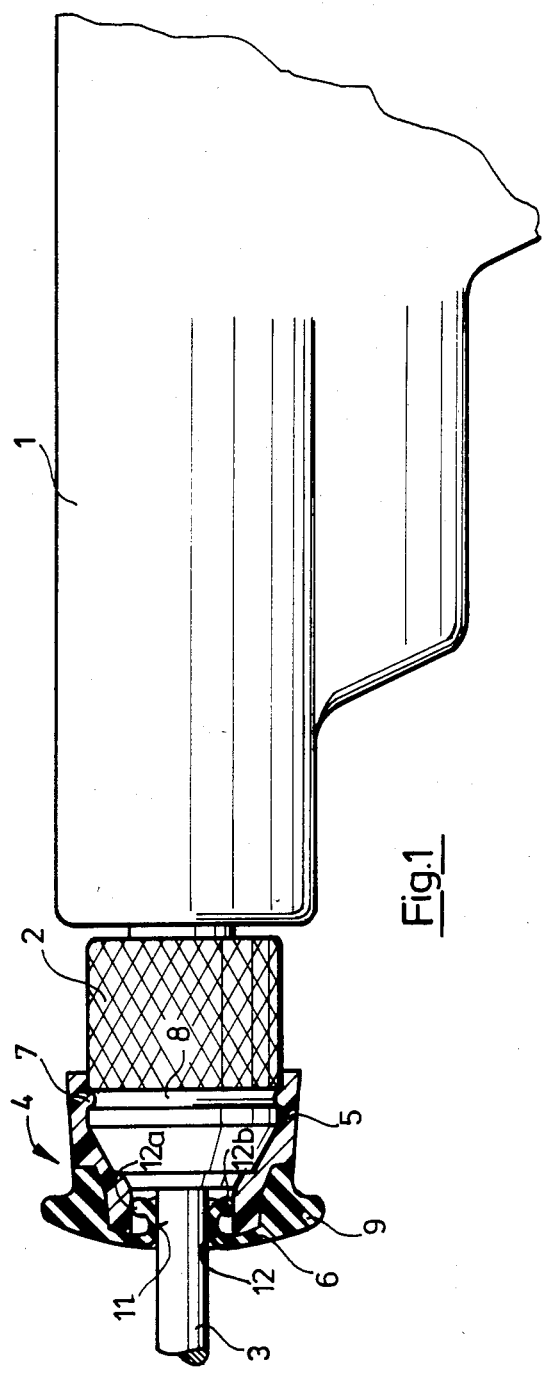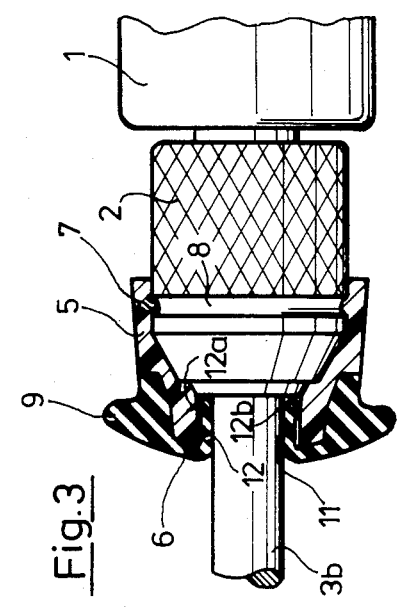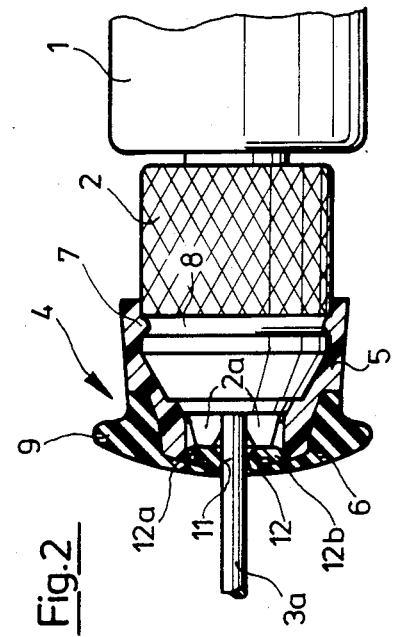

DUST GUARD CAP FOR A HAND-HELD DRILLING DEVICE

BACKGROUND OF THE INVENTION

The present invention is directed to a cup-like dust guard cap for covering the opening for drilling tools in the tool holder in a hand-held drill. The guard includes a casing secured on the tool holder and a cover member with a through-opening for the tool. The cover member includes a seal for the tool as it extends through the guard into the tool holder.

Dust guard caps of the type described above protect the tool holders in hand-held drills and such tool holders are relatively sensitive to dirt such as from drillings and drill dust generated in the drilling operation.

Despite the use of resilient or elastic materials, such as rubber or the like, the known dust guard caps have had the disadvantage of sharply limited radial expandability at the through-opening. As a result, one dust guard cap is suitable only for a small range of tool diameters. Accordingly, for smaller diameter tools there is the problem of unsatisfactory sealing, while with larger diameter tools considerable friction is developed. Moreover, excessive stretching of the dust guard occurs for large diameter tools and results in damage.

Accordingly, dust guard caps with a through-opening in the cover part are known and the rim of the opening is provided with radially arranged slots. These slots improve the expandability of the through-opening so that a greater range of tool diameters can be accommodated. The disadvantage of this type of dust guard cap is insufficient sealing for the range of tool diameters used, because drill dust and drillings enter the tool holder through the slots.

SUMMARY OF THE INVENTION

Therefore, the primary object of the present invention is to provide a dust guard cap suitable for a wide range of tool diameters while assuring a good sealing effect.

In accordance with the present invention, a seal is provided by an elastically resilient torus forming the opening through the guard into the tool holder.

A torus embodying the present invention is a tubular or sleeve-like elastic member connected with the cover plate of the dust guard cap and laterally enclosing the tool extending into the tool holder. Due to the hollow space formed by the torus, it can be deformed elastically to a considerable degree forming a through-opening which can be considerably varied in diameter. As a result, no overstretching or harmful friction forces are developed at the tool seal. Due to this arrangement a dust guard cap is available for holding on the rotating tool holder as well as for its stationary arrangement on the drilling device collar.

The dust guard cap embodying the present invention can be formed as a single element constructed of a resilient elastic material, such as rubber, it is also possible to form the dust guard cap as a conduit-like casing and a cover member which fit one on the other to form the dust guard cap. The advantage of the two part arrangement is that the optimum material selection can be made for the casing and the cover member.

The torus is preferably formed by an inwardly extending sleeve-like section which bears against the inside wall of the casing. By supporting the free end of the torus, stability with respect to shape is afforded so that a sufficient sealing action for the drilling tool is attained, despite high deformability.

Advantageously, the axial length of the sleeve-like torus amounts approximately to one to three times the diameter of the through-opening. In addition, the radial height of the torus amounts to one to two times the diameter of the through-opening. By using this dimensional relationship an optimum coordination is afforded for deformability and the sealing action over a wide range of tool diameters.

To achieve an optimum relation between the strength of the cover member and the deformability of the through-opening in the cover member, the wall thickness of the cover member amounts preferably to 0.2 to 0.5 times the diameter of the through-opening.

Another feature of the invention is a wall bead or reinforcement formed on the free end of the sleeve-like torus spaced from the cover member. If the largest possible tool diameter is inserted, the torus is pressed outwardly with the wall bead bearing against the inside surface of the casing. The part of the torus adjoining the wall bead, which is pressed flat, is kept a distance from the inside surface of the casing corresponding to the projecting dimension of the wall bead to provide a seal around the tool accompanied by the pre-tensioning.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a partial side view, partly in section, of a hand-held drilling device with a tool holder and inserted tool of an average diameter and a dust guard cap embodying the present invention;

FIG. 2 is a partial view of the device shown in FIG. 1 holding a tool of a smaller diameter;

FIG. 3 is a partial view of FIG. 1, however, illustrating a tool of a larger diameter.

DETAILED DESCRIPTION OF THE INVENTION

Figure 4:
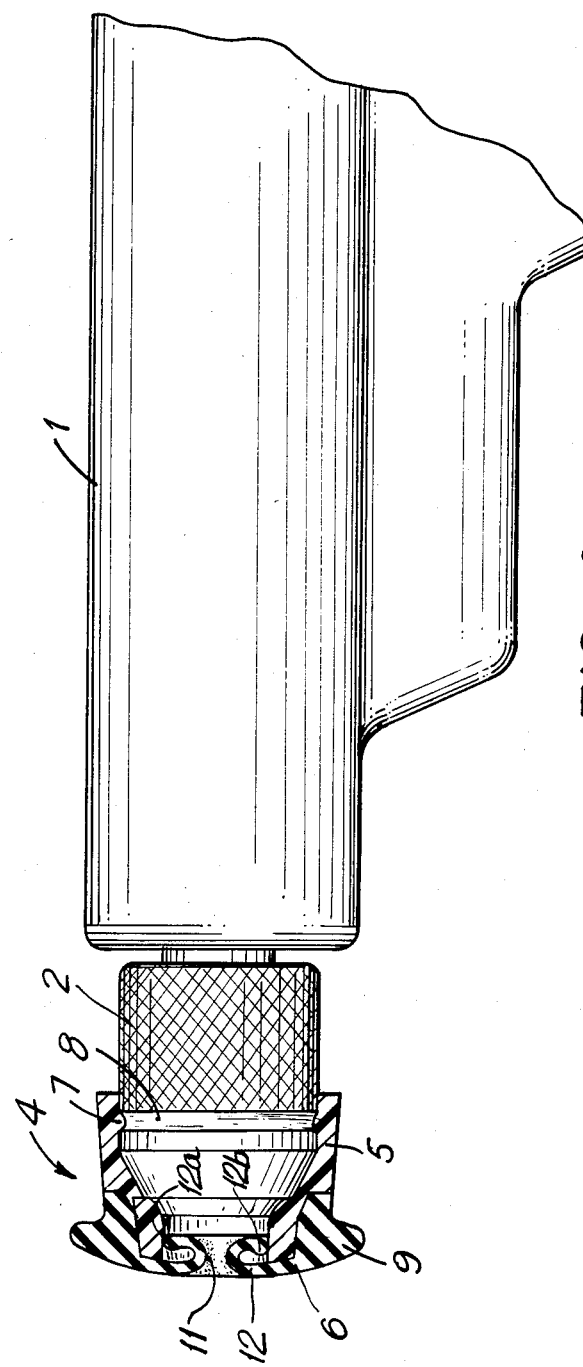
FIG. 4 is a view similar to FIG. 1, however, without the insertion of a tool through the dust guard cap into the tool holder.

In FIG. 1 a part of a hand-held drilling device 1 is displayed with a tool holder 2 mounted on its front or left side with the tool holder in the form of a three-jaw chuck. A tool, such as a drilling tool, of an average diameter is inserted into the drill holder 2. A dust guard cap 4 is mounted on and extends over the front end of the tool holder 2.

The dust guard cap 4 is made up of a conduit-like casing 5 formed of a plastics material which is stiffer than a cover member 6 laterally enclosing one end of and extending transversely across the casing. The inside surface of the casing has an annular inwardly directed projection 7 which seats in an annular groove 8 for securing the cap 4 on the tool holder 2. The cover member 6 has an annular protective collar 9 formed on and extending outwardly from its radially outer surface. The cover member 6 includes a tube-like section extending around the front end of the casing 5 with a cover plate located within the tube-like section and extending transversely of the axial direction of the tool holder 2. The cover plate forms a through-opening 11 axially aligned with the axis of the casing 5. The through-opening 11 is defined by a seal member in the form of an axially extending sleeve-like torus 12. One end of the torus is secured to the plate member while the other end projects inwardly within the casing 5. The inner or free end 12a of the torus 12 has an outwardly extending wall bead 12b, note FIG. 1. In the position shown in FIG. 1 the wall bead 12b is spaced axially inwardly from the cover plate of the cover member and bears against the inside surface of the casing 5. The axially extending portion of the torus between the cover plate and the wall bead 12b is in sealing contact with the surface of the drilling tool 3. If a small diameter tool 3a is inserted into the tool holder 2, as shown in FIG. 2, the seal is effected by the inside surface of the torus 12 and its free end 12a is located at the inside surface of the casing 5. In the arrangement shown in FIG. 2 the sleeve-like section of the torus is folded over upon itself with the wall bead 12b bearing against the inside surface of the cover plate and the inside surface of the casing 5. With the tool holder 2 in the form of a three-jaw chuck, an increase in the sealing effect is developed with the jaws 2a of the chuck pressing the tube-like section of the torus against the inside surface of the cover plate. The jaws 2a on the chuck move forwardly toward the front end of the device when small diameter tools are being clamped. Due to this folded over arrangement with the assistance of the jaws 2a, the surface of the torus bears against the drilling tool 3a with greater force.

If, as shown in FIG. 3, a tool 3b of the largest possible diameter is used, the sleeve-like torus 12 is pressed inwardly into an axially extending sleeve or tube-like arrangement with the wall bead 12b at its inner end bearing against the inside surface of the casing 5. With the torus 12 being pressed flat, as compared to the arrangements shown in FIGS. 1 and 2, it contacts the tool 3b over a greater axial length accompanied by pre-tensioning so as to provide a seal around the tool.

As can be seen in FIG. 4, the sleeve-like torus 12 is shaped so that it forms the through-opening 11 with its free end 12a spaced axially from the connection to the cover plate and its wall bead 12b in contact with the inner surface of the casing 5. The position of the sleeve-shaped torus 12 in FIG. 2 is influenced by the position of the jaws 2a.

While specific embodiments of the invention have been shown and described in detail to illustrate the application of the inventive principles, it will be understood that the invention may be embodied otherwise without departing from such principles.

We claim:

1. Cup-like dust guard cap for use on a tool holder in a drilling device for forming a seal at the entrance for a tool into the tool holder, comprising an axially extending conduit-like casing arranged to enclose laterally the tool holder, said casing having a first end and a second end spaced apart in the axial direction with said first end arranged to extend around the tool holder and the second end arranged to extend axially outwardly from the tool holder with said casing forming an axially extending passage from the second end toward the first end aligned with the entrance into the tool holder, said casing having a radially inside surface forming the passage and a radially outside surface each extending in the axial direction thereof, means on said casing for securing said casing on the tool holder, a monolithic cover member positioned on the second end of said casing and including a cover plate and an axially extending tubular section formed monolithically with said cover plate and with said cover plate extending transversely of the axial direction of said casing across and forming at least a partial closure for the second end of said casing and extending at least partly across the passage in said casing, said tubular section in contact with and laterally enclosing the outside surface of said casing, said cover plate having a radially outer circumferentially extending edge, said tubular section secured to said outer edge of said cover plate and extending in the axial direction of said casing toward the first end thereof with said tubular section laterally enclosing and bearing tightly against the outside surface of said casing, an elastically resilient sleeve-like torus secured centrally to said cover plate concentric to the axis of said casing and having a first end and a second end with said first end secured to said cover plate, said sleeve-like torus is shaped in the axial direction of said casing so that it has an arcuate configuration viewed in axial section of said casing whereby said torus initially extends radially inwardly from said cover plate then in the axial direction of said casing and finally radially outwardly so that the second end thereof projects outwardly into contact with the inside surface of said casing, said torus extending axially inwardly within the passage in said casing toward the first end of said casing so that said second end thereof is located inwardly from said cover plate within the passage in said casing, said torus intermediate the first and second ends thereof forms a variable diameter through-opening in said cover plate so that tools of a range of diameters can be inserted therethrough extending through the passage in said casing into the tool holder, said sleeve-like torus having a first surface and an opposite second surface with said first surface thereof arranged to contact and form a seal around the tool inserted into the tool holder, the second end of said sleeve-like torus is a free end supported by the inside surface of said casing, and said torus being variably deflectibly positionable within the passage in said casing for adapting to various diameter sizes of tool inserted into the tool holder.

2. Cup-like dust guard cap, as set forth in claim 1, wherein the overall axial length of said sleeve-like torus extending undeflected between the first and second ends thereof is approximately 1 to 3 times the diameter of the through-opening.

3. Cup-like dust guard cap, as set forth in claim 2, wherein the radial height of said sleeve-like torus is 1 to 2 times the diameter of the through-opening.

4. Cup-like dust guard cap, as set forth in claim 3, wherein the wall thickness of said cover plate is 0.2 to 0.5 times the diameter of the through-opening.

5. Cup-like dust guard cap, as set forth in claim 4, wherein the second end of said sleeve-like torus has a wall bead projecting radially outwardly from the second surface of said sleeve-like torus into contact with the inside surface of said casing within the passage formed by said casing.

6. Cup-like dust guard cap, as set forth in claim 1, wherein said casing is formed of a plastics material and said cover member of a resilient elastic material and said casing is stiffer than said cover member.

7. Cup-like dust guard cap, as set forth in claim 1, wherein said means on said casing comprises an inwardly projecting annular protuberance formed on the inside surface of said casing for engaging in a corresponding groove in the tool holder.

* * * * *